(12) United States Patent
Hiyoshi et al.

(10) Patent No.: US 9,037,382 B2
(45) Date of Patent: May 19, 2015

(54) CONTROL SYSTEM FOR INTERNAL COMBUSTION ENGINE

(71) Applicant: Nissan Motor Co., Ltd., Yokohama-shi, Kanagawa (JP)

(72) Inventors: Ryosuke Hiyoshi, Atsugi (JP); Shinobu Kamada, Kawasaki (JP); Eiji Takahashi, Isehara (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 196 days.

(21) Appl. No.: 13/942,796

(22) Filed: Jul. 16, 2013

(65) Prior Publication Data

US 2014/0041607 A1 Feb. 13, 2014

(30) Foreign Application Priority Data

Aug. 13, 2012 (JP) ................. 2012-179167

(51) Int. Cl.
*F01L 1/34* (2006.01)
*F02D 13/02* (2006.01)
*F02D 15/02* (2006.01)
*F01L 1/053* (2006.01)

(52) U.S. Cl.
CPC ........... *F01L 1/34* (2013.01); *F01L 2001/0537* (2013.01); *F01L 2800/00* (2013.01); *F01L 2800/14* (2013.01); *F01L 2800/16* (2013.01); *F02D 13/0249* (2013.01); *F02D 15/02* (2013.01); *Y02T 10/18* (2013.01)

(58) Field of Classification Search
CPC .................... F01L 2001/0537; F01L 2800/00; F01L 2800/14; F01L 2800/16; F02B 75/04; F02D 13/00; F02D 13/0242; F02D 13/0249; F02D 15/00; F02D 15/02
See application file for complete search history.

(56) References Cited

U.S. PATENT DOCUMENTS

| | | | |
|---|---|---|---|
| 2004/0216707 A1* | 11/2004 | Minami et al. | 123/90.16 |
| 2005/0103290 A1* | 5/2005 | Magner et al. | 123/90.16 |
| 2007/0215126 A1* | 9/2007 | Shiraishi et al. | 123/568.14 |
| 2010/0180869 A1* | 7/2010 | Akihisa et al. | 123/48 C |
| 2015/0034052 A1* | 2/2015 | Shimizu | 123/48 R |

FOREIGN PATENT DOCUMENTS

JP 2005-002931 A 1/2005

* cited by examiner

*Primary Examiner* — Thomas Moulis
*Assistant Examiner* — Elizabeth Hadley
(74) *Attorney, Agent, or Firm* — Young Basile

(57) ABSTRACT

A control system is provided with a piston TDC (top dead center) position variable mechanism and a valve operational characteristics variable mechanism. An actual distance between the valve and the piston of closest approach is calculated based on the actual operation states of these mechanisms. In addition, a limit distance of closest approach necessary to avoid interference between the valve and the piston is set, and, the piston TDC position variable mechanism and the valve operational characteristics variable mechanism are controlled to be driven to increase the actual distance.

8 Claims, 8 Drawing Sheets

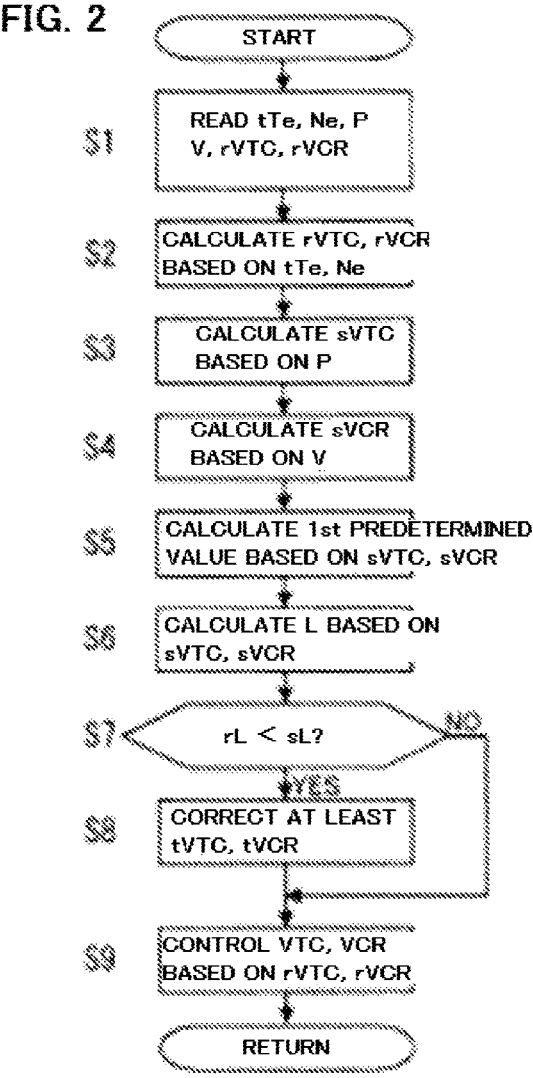

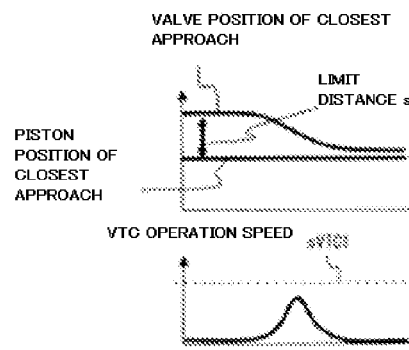

FIG. 6A

VALVE POSITION OF CLOSEST APPROACH

LIMIT DISTANCE sL

PISTON POSITION OF CLOSEST APPROACH

VTC OPERATION SPEED

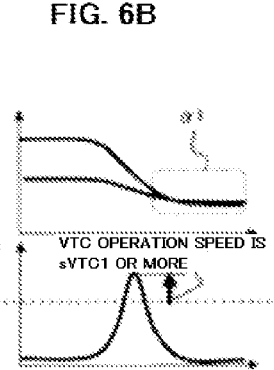

FIG. 6B

VTC OPERATION SPEED IS sVTC1 OR MORE

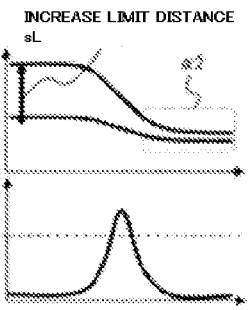

FIG. 6C

INCREASE LIMIT DISTANCE sL

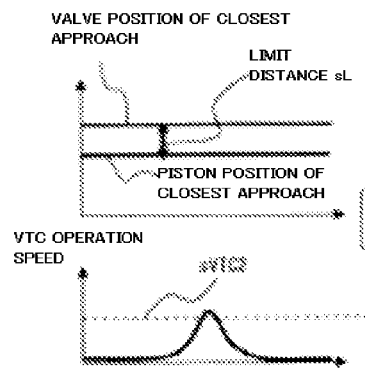

FIG. 7A

VALVE POSITION OF CLOSEST APPROACH

LIMIT DISTANCE sL

PISTON POSITION OF CLOSEST APPROACH

VTC OPERATION SPEED

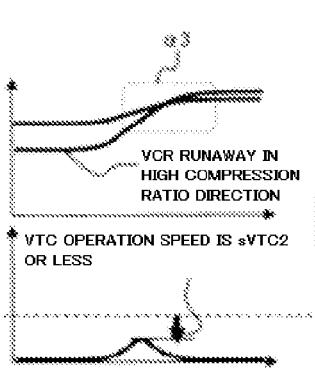

FIG. 7B

VCR RUNAWAY IN HIGH COMPRESSION RATIO DIRECTION

VTC OPERATION SPEED IS sVTC2 OR LESS

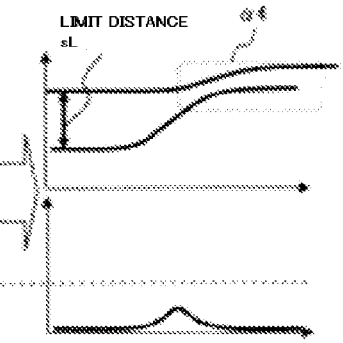

FIG. 7C

LIMIT DISTANCE sL

CONTROL SYSTEM FOR INTERNAL COMBUSTION ENGINE

CROSS-REFERENCE TO RELATED APPLICATION

This application claims priority under 35 U.S.C. §119 to Japanese Patent Application No. 2012-179167, filed Aug. 13, 2012, The entire disclosure of which is hereby incorporated herein by reference.

TECHNICAL FIELD

The present invention generally relates to a control system for an internal combustion engine, and relates in particular to a technique for avoiding interference between a piston and an intake valve and/or an exhaust valve.

BACKGROUND

Conventionally, in an internal combustion engine provided with both a variable compression ratio mechanism capable of changing the top dead center position of the piston and a variable valve train mechanism capable of changing the operational characteristics of an intake valve and/or exhaust valve, such as described in Japanese Patent Application Publication No. 2005-2931 A, it is necessary to secure the shortest distance (clearance) of closest approach of the valve and the piston approach relatively large in view of the varieties of movements of these parts so that the valve and piston would not interfere with each other with any chance.

BRIEF SUMMARY

However, when the minimum distance (clearance) between the valve and the piston is secured larger than necessary, there is a problem that the effective compression ratio lowers, which leads to decrease in output torque output and fuel economy along with increase in engine size. Further, in order to secure a large minimum inter-distance between the valve and piston with the depth of valve recess formed in a piston crown surface being increased for avoidance of the valve interference, the S/V ratio of the combustion chamber deteriorates, and the fuel consumption is worsened. In addition, various problems are involved such as decrease in torque output due to lower thermal efficiency, deterioration in exhaust emissions due to unburned fuel which is attributable to increase in the surface area of the combustion chamber.

The present invention has been made in view of these situations. Specifically, in an internal combustion engine provided with both a piston TDC (Top Dead Center) position variable mechanism and a valve operational characteristics variable mechanism, the present invention aims, while avoiding the interference between the valve and piston reliably, to achieve improvements in fuel economy and output performance while maintaining the size of the internal combustion compact.

A control system according to the present invention is provided with a piston top dead center (TDC) position variable mechanism capable of changing the TDC position of the piston, a valve operational characteristics variable mechanism capable of changing the operational characteristics of at least one of the intake valve and exhaust valve, a first detecting mechanism for detecting an actual operation state of the piston TDC position variable mechanism, a second detecting mechanism for detecting an actual operation state of the valve operational characteristics variable mechanism, a first operation speed estimating mechanism for estimating the operation speed of the piston TDC position variable mechanism, and a second operation speed estimating mechanism for estimating the operation speed of the valve operational characteristics variable mechanism.

An actual distance between the valve and the piston of closest approach is calculated based on the actual operation state of the piston TDC position variable mechanism and the actual operation state of the valve operational characteristics variable mechanism. In addition, based on at least one of the operation speed of the piston TDC position variable mechanism and the operation speed of the valve operational characteristics variable mechanism, a limit distance between the valve and piston representing a distance of closest approach necessary to avoid a mutual interference between the valve and the piston. Further, when determined that the actual distance is less than the limit distance, in order to increase the distance of closest approach of valve and piston, at least one of the piston TDC position variable mechanism and the valve operational characteristics variable mechanism will be controlled to drive.

The "limit distance" is defined to correspond to the shortest distance of the closest approach between the valve and the piston, which enables to avoid the interference between the valve and the piston even if one of the piston TDC position variable mechanism and the valve operational characteristics variable mechanism would go out of control to operate in a unexpected direction at the maximum speed, i.e., at runaway.

According to the present invention, even if one of the piston TDC position variable mechanism and the valve operational characteristics variable mechanism would be uncontrollable and operate in a direction unexpected at maximum operation speed, the interference between the valve and the piston may be reliably avoided. Further, within a range in which the valve and piston may be avoided reliably, the distance of closest approach between the valve and the piston may be quickly short so that improvements in fuel economy as well as output performance as well as compactness of the engine may be achieved.

BRIEF DESCRIPTION OF THE DRAWINGS

Referring now to the attached drawings which form a part of this original disclosure:

FIG. 2 is a flowchart showing the flow of control of avoidance of interference between the valve and the piston;

FIG. 6A is an explanatory diagram showing the setting the limit distance with respect of the operation speed of the variable valve train mechanism;

FIG. 6B is an explanatory diagram showing a Comparative Example without increasing the limit distance;

FIG. 6C shows a behavior of the embodiment with the limit distance increased, both when the operation speed of the variable valve mechanism is equal to or greater than a first predetermined value;

FIG. 7A is an explanatory diagram showing the setting the limit distance with respect of the operation speed of the variable valve train mechanism;

FIG. 7B is an explanatory diagram showing a Comparative Example without increasing the limit distance;

FIG. 7C shows a behavior of the embodiment with the limit distance increased, both when the operation speed of the variable valve mechanism is equal to or less than a second predetermined value;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
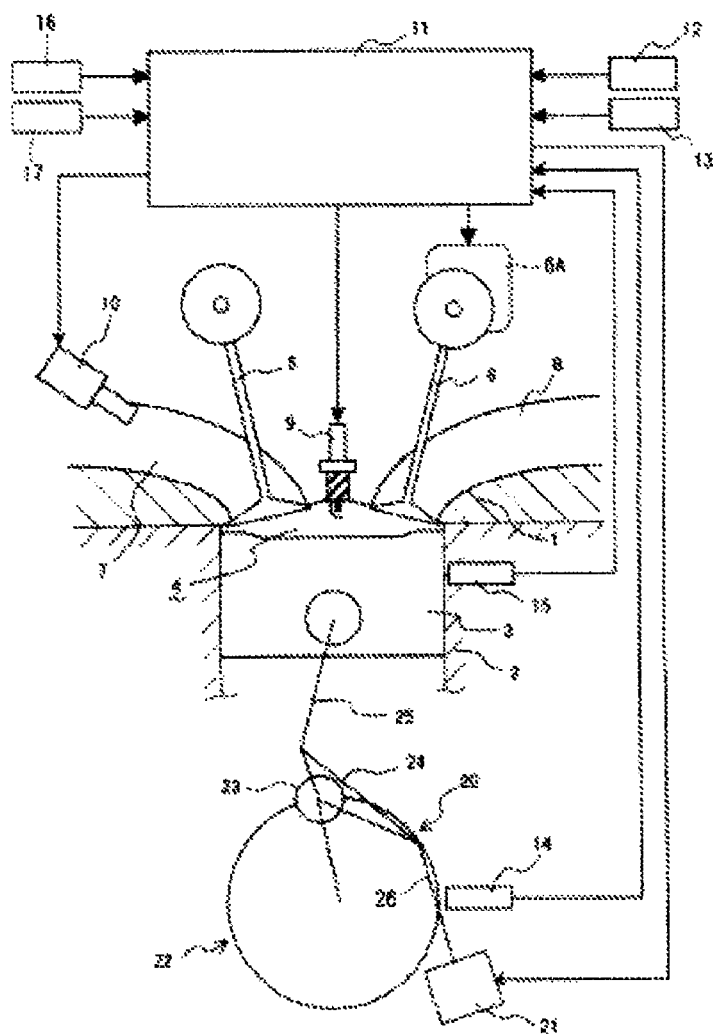
FIG. 1 is a block diagram showing a control system for an internal combustion engine according to one embodiment of the present invention.

FIG. 1 is a schematic system diagram illustrating an embodiment according to the on as applied to the spark ignition, gasoline engine. The internal combustion engine is generally constructed of a cylinder head 1 and a cylinder block 2, and is further provided with a spark plug 9 to ignite by spark a mixture air within a combustion chamber partitioned above piston 3, an intake valve 5 for selectively open and close the intake port 7, an exhaust valve for selectively open and close the exhaust port 8, and an injector valve 1 for injecting the fuel in the intake port 7.

Further, as the variable device for changing the TDC position of piston 3 (piston TDC position variable mechanism), a variable compression ratio mechanism 20 (herein after also referred to as "VCR") that may vary the engine compression ratio continuously in accordance with change in the piston TDC position is provided. Moreover, as a variable device for varying the operational characteristics of at least one of an intake valve 5 and an exhaust valve 6 (valve operational characteristics variable mechanism), a variable valve mechanism 6A capable of varying or changing the operational characteristics of the exhaust valve 6 (hereinafter also referred to as "VTC") is provided.

ECU (Engine Control Unit) 11 is a conventional digital computer system having a CPU, ROM, RAM and I/O interface. Based on detection signals from various sensors such as an accelerator opening sensor 12 for detecting an accelerator opening degree, a water temperature sensor for detecting the engine coolant temperature, a crank angle sensor 14 for detecting an engine rotation speed, a knock sensor 15 for detecting the presence or absence of knocking, a cam angle sensor 16 for detecting a rotational angle of the exhaust camshaft 6B, and an angler sensor 17 for detecting an angular position of a control shaft of variable compression ratio mechanism 20, ECU 11 outputs control signals to an electric motor 21 representing an actuator for a fuel injector 10, a spark plug 9, a variable compression ratio mechanism 20 and to an actuator of the variable valve mechanism 6A and the like to integrally control a fuel injection amount, a fuel injection timing, an ignition timing, and a throttle opening, an engine compression ratio (a piston TDC position), a valve operational characteristics of exhaust valve 6, and the like.

The general construction of the variable compression ratio mechanism 20 is known from the above-described Japanese Patent Application Publication No. 2005-2931, which in incorporated herein by reference in its entirety. Brief explanation thereof is made here.

The variable compression ratio 20 is provided with a lower link 24 installed rotatably on a crank pin 23 of crank shaft 22, an upper link 25 connecting this lower link 24 to piston 3, a control link 26 with one end (upper end) connected to lower link 24. The other end of control link 26 is attached rotatably to an eccentric shaft portion of the control shaft (not shown), and, in accordance with change in the rotational position of the control shaft by the electric motor 21, the supporting position of the other end of control link 26 changes so that the movement restriction state of the lower link 24 by the control link 26 changes to continuously vary or change the engine compression ratio along with change in the TDC position of piston 3.

The variable valve mechanism 6A is, as is known, capable of changing the opening and closing timing of the exhaust valve 6 continuously, by varying the center angle phase of the exhaust camshaft 6B either to the retard side or the advanced side with respect to the crank angle of the crankshaft 22. The variable valve mechanism 6A is not limited thereto, but may be configured as a variable lifting working angle mechanism that may vary the working angle of the valve as well as the valve lift continuously as well.

Note that, in the present embodiment, an actuator excellent in responsiveness is used as the actuator that drives the variable compression ratio mechanism 20, while an hydraulic mechanism of low response (not shown) is used for an actuator of the variable valve mechanism 6A. Therefore, the variable compression ratio mechanism 20 is more excellent in responsiveness compared to the variable valve mechanism 6A. Note that the combination of the actuators is not limited to this. For example, contrary to the present embodiment, a hydraulic drive mechanism may be used for the variable compression ratio mechanism 20 while the electric motor may be used for the variable valve mechanism 6A. Alternatively, an electric system or hydraulic system may be commonly used for both the variable compression ratio mechanisms 20 and variable valve mechanism 6A.

FIG. 2 is a flowchart showing the flow of control of the present embodiment. This routine is stored and repeatedly executed by the ECU11 described above at predetermined intervals (e.g. every 10 ms). Definitions of the reference numerals in the drawing are as follows.

tTe is a target engine torque set according to the accelerator opening degree or the like which is detected by the accelerator opening sensor 12 described above.

Ne is an engine rotation speed detected by the crank angle sensor 14 described above.

P is the engine oil pressure supplied to the hydraulic drive mechanism of the variable valve mechanism 6A, and is detected by a hydraulic pressure sensor (not shown) or estimated based on the engine rotation speed Ne described above and the like.

V is the voltage of the battery to be installed in a vehicle. The electric motor 21 of the variable compression ratio mechanism 20 is operated by power supplied from the battery.

rVTC is an actual center phase angle (actual or real operating state) of the exhaust valve 6 and is determined on the basis of the detection signal of the crank angle sensor 14 and the cam angle sensor 16 (the second detection mechanism).

rVCR denotes an actual TDC position of piston 3 and is obtainable based on detection signal of angle sensor 17 to detect the angular position of control shaft of variable compression ratio mechanism 20, for example (the second detection mechanism). Alternatively, the TDC position of piston 3 may also be detectable directly by using a position sensor.

tVTC is a target center angle phase of the exhaust valve 6, as will be described later, and is set based on the engine rotation speed Ne, target engine torque tTe, etc.

tVCR is denotes a target TDC position of the piston 3, set according to the engine rotational speed Ne and the target engine torque tT. In practice, the target compression ratio is set according to the engine rotational speed Ne and the target engine torque tTe, the target TDC position tVCR of the piston 3 is uniquely determined by the target compression ratio.

sVTC is the maximum operation speed of variable valve mechanism 6A of (VTC) (hereinafter referred to as "VTC operating speed"), and is calculated on the basis of at least one of the engine oil pressure and engine oil temperature. In the case of the electric motor being incorporated in the variable valve mechanism 6A, the VTC operating speed sVTC is calculated using battery voltage V.

sVCR is the maximum operation speed (hereinafter referred to as "VCR operating speed") of the variable compression ratio mechanism 20 driven by electric motor 21 and is calculated based on the battery voltage V and the like described above. Incidentally, when the variable compression ratio mechanism 20 is hydraulically driven, VCR operating speed sVCR is calculated based on at least one of the engine oil temperature and engine oil pressure. Further, when the hydraulic drive mechanism is constructed by an electromagnetic valve selectively opening and closing a hydraulic chamber, VCR operating speed sVCR is calculated by using the engine torque or the like.

rL is an actual shortest or minimum distance (hereinafter referred to as "actual distance") between the piston 3 and the exhaust valve 6 by which piston 3 and exhaust valve 6 approach closest, and is calculated based on the actual center phase angle rVTC and the actual TDC position rVCR.

sL denotes the distance of the closest approach required to avoid interference between the piston 3 and an exhaust valve 6 (hereinafter referred to as "critical or limit distance") and is set based on at least one of the sVTC and sVCR.

With reference to FIG. 2, in step S1, the target engine torque tTe, the engine speed Ne, engine oil pressure P, the battery voltage V, the actual center phase angle rVTC, and the actual top dead center position rVCR are read and received. In step S2, based on the engine rotation speed Ne and target engine torque tTe, the target center angle phase tVTC and target TDC position of piston 3 (target compression ratio) are calculated, respectively.

In step S3, based on engine oil pressure P, the VTC operating speed sVTC is calculated. As the engine oil pressure P increases, the responsiveness of the variable valve mechanism 6A improves, thus VTC operating speed sVTC increases accordingly. Further, it is also possible to calculate the VTC operating speed sVTC using the engine oil temperature. In this case, in accordance with the engine oil temperature being increased, the response of the variable valve mechanism 6A is improved due to a decrease in oil viscosity, VTC operating speed sVTC thereby increases.

In step S4, based on the battery voltage V, VCR operating speed sVCR is calculated. The more the battery voltage V is higher, the responsiveness of the variable compression ratio mechanism 20 is improved, and VCR operating speed sVCR thereby becomes higher. As the battery voltage V is low, because the responsiveness of the variable compression ratio mechanism 20 is lowered, VCR operating speed sVCR is thus lower. Further, it is also possible to calculate the VCR operating speed sVCR using the engine oil temperature. In this case, because along with increase in the engine oil temperature, the responsiveness of the variable compression ratio mechanism 20 is improved due to a decrease in oil viscosity. Consequently, VCR operating speed sVCR increases.

In step S5, based on the VTC operating speed sVTC and VCR operating speed sVCR, the critical or limit distance sL is calculated (critical distance calculation mechanism). This critical distance sL denotes the distance at which the exhaust valve and the piston approach closest required to avoid interference of exhaust valve 6 with piston 3. Stated another way, this corresponds to the minimum or shortest distance of closest approach between valve and piston by which exhaust valve 6 and piston 3 may reliably avoid interference, even if one of the variable valve mechanism 6A and the variable compression ratio mechanism 20 would become uncontrollable and would operate (runaway) in a unexpected direction at the maximum operating speed (either at sVTC or sVCR). At step S6, based on the center phase angle tVTC and the actual TDC (top dead center) position, an actual distance rL (actual distance calculation mechanism).

In step S7, determination is made as to whether or not the actual distance rL is less than the limit distance sL. When it is determined that actual distance rL is less than the limit distance sL so that there is a possibility that the piston 3 would interfere with an exhaust valve 6, the process proceeds to step S8, and the distance of (rL) of the closest approach between the piston 3 and an exhaust valve 6 will be increased by compensating for at least one of the target center phase angle tVTC and target TDC (top dead center) position tVCR. In other words, in order for the actual distance rL to be larger than the limit distance sL, at least one of the target center phase angle tVTC and the target dead center position tVCR (distance increasing mechanism) will be compensated for or corrected. Incidentally, when the actual distance rL is equal to or above the limit distance sL, without performing the correction in step S8, the process proceeds to step S9 from step S7.

In step S9, based on the target center angle phase tVTC described above, variable valve timing mechanism 6A (VTC) is controlled to drive along with the drivingly control of variable compression ratio mechanism 20 (VCR) based on the target TDC position tVCR.

Figures 3A, 3B, 3C:
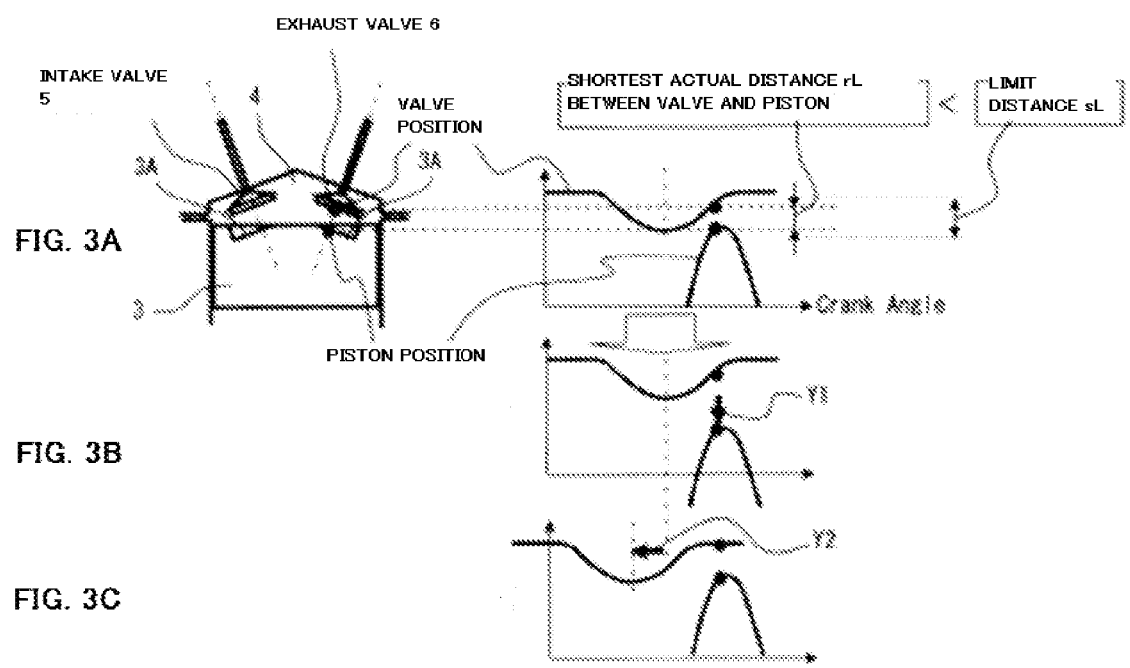
FIGS. 3A-3C is an explanatory view showing the operating directions of the piston top dead center position and of the valve operational characteristics, during the interference avoidance control, respectively.
Figure 4A:
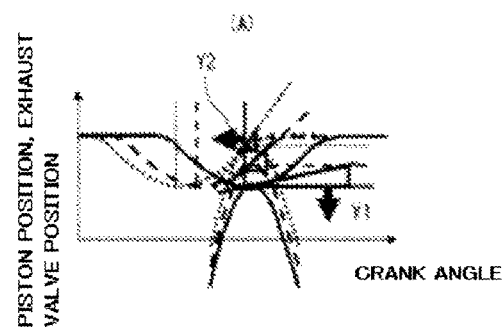
FIG. 4A is an explanatory diagram showing the operating direction of the piston top dead center position and the valve operating characteristics during control or correction at the time for interference avoidance of the piston and the exhaust valve.
Figure 4B:
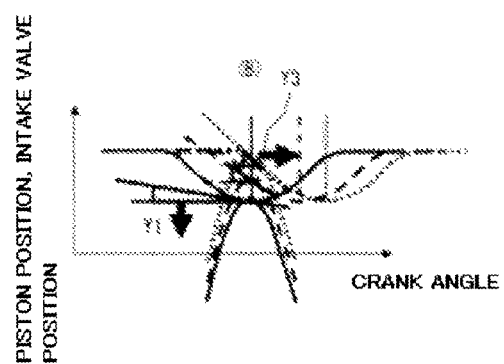
FIG. 4B is an explanatory diagram showing the operating direction of the piston top dead center position and the valve operating characteristics during control or correction at the time for interference avoidance of the piston and the intake valve.

With reference to FIGS. 3 and 4, the corrections of the target center phase angle tVTC as well as the target TDC position tVCR in the step S8 will be further described. As shown in FIG. 3A, the crown surface of the piston 3 is recessed to form a valve recess 3A for avoiding interference with intake valve 5 or exhaust valve 6. The FIG. 3A illustrates a state in which the exhaust valve 6 and piston 3 approaches closest, wherein rL denotes the minimum actual distance between valve and piston, while sL denotes the limit or critical distance described above.

Since the actual distance rL increases as the piston TDC position will be lower, in the case of correcting the target dead point tVCR target in step S8 described above, as indicated by arrow Y1 in FIGS. 3B and 4A, the target TDC position tVCR is corrected toward the lower side to increase the actual distance rL. Further, since the actual distance rL increases as the center phase angle of exhaust valve 6 is advanced, when correcting the target center phase angle tVTC in step S8, as shown by arrow Y2 in FIGS. 3C and 4A, the target center phase angle tVTC will be corrected toward an advanced side.

Note that, when the variable valve mechanism is applied to an intake valve 5, the actual distance rL is increased by retarding the center phase angle of intake valve 5. Thus, when correcting in step S8, as shown by arrow Y3 in FIG. 4B, the target center phase angle of intake valve 5 will be corrected in the retard side to increase the actual distance rL.

Although not shown, if there is a possibility that one of the VCR and VTC becomes uncontrollable due to some abnormality and runaway would occur, a failsafe mode is invoked in which the other normal VCR or VTC is controlled to be driven so as to avoid interference between valve and piston. In other words, the variable valve mechanism 6A is controlled to be driven to the advanced side, or. The variable compression ratio mechanism 20 may be controlled to be driven to the side of lower compression ratio to lower the piston TDC position.

[1] As described above, in the present embodiment, based on the target center phase angle tVTC and the target TDC position tVCR each being indicative of the actual states of the VTC and VCR, respectively, the actual distance rL at the point in time of closest approach of is calculated. In addition, based on the VTC operational speed sVTC and/or the VCR operational speed sVCR, the limit or critical distance sL required for avoidance of conflict or interference between exhaust valve 6 and piston 4 is obtained considering the responsiveness of VTC and VCR. Thus, when the actual distance rL is less than the limit distance sL, at least one of the target phase angle tVTC and target TDC position tVCR is corrected and at least one of the VTC and VCR is controlled to be driven in order for the actual distance rL to increase more than the limit distance (distance increasing mechanism).

Thus, even if one of the VTC and VCR should runaway for some abnormality or other and would operate in a unexpected direction at maximum operational speed, since the actual distance rL is set in advance to or more than the limit distance sL, the interference between the valve and the piston may be avoided reliably. In addition, within a range in which the valve can be prevented from conflicting on the piston, the distance between the valve and the piston may be set as small as possible so that improvement in fuel economy and compactness of the engine may be achieved.

Figure 5:
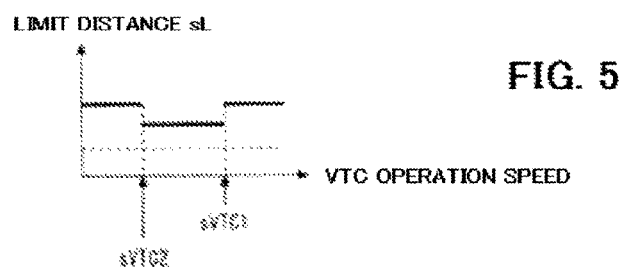
FIG. 5 is an axial front schematic view of a crankshaft illustrating the structural body of the first embodiment.

[2] Now description is made with reference to FIGS. 5 to 9 on how to set the limit distance sL specifically in accordance with the operational speeds, sVTC and sVCR. As shown in FIG. 5, when the VTC operational speed sVTC is a predetermined first value sVTC1 or more, compared to the case in which the VTC operational speed sVTC is less than the first predetermined value sVTC1, the limit distance is set greater. Referring to FIG. 6, when the VTC operational speed sVTC is the first predetermined value sVTC1 or more, the operational speed at the time of VTC runaway is high so that, without setting the limit distance sL larger as shown in FIG. 6B as Comparative Example, the piston has a risk of interference with the valve as indicated by the reference $\alpha 2$ due to insufficient lowering of the piston TDC position of VCR. By contrast, in the present embodiment shown in FIG. 6C, when the VT operational speed sVTC is greater than the first predetermined value sVTC1, because of the limit distance being set larger in advance, the actual distance rL is secured to be large, so that, as shown by reference $\alpha 2$, the interference of the valve with the piston may be avoided reliably even at the VTC runaway.

[3] As shown in FIG. 5, when the VTC operational speed sVTC is equal to or less than a second predetermined value sVTC2 which is less than the first predetermined value sVTC1, compared to the case in which the VTC operational speed sVTC is greater than the second predetermined value (and, less than the first predetermined value sVTC1), the limit distance sL is set greater. With reference to FIG. 7, when the VTC operational speed sVTC is small and less than the second predetermined value sVTC2 with low responsiveness, unless the limit distance is set larger as shown in FIG. 7B as Comparative Example, the piston and the valve may come into interference as indicated by reference $\alpha 3$ at VCR runaway due to insufficient advance of exhaust valve by the VTC of low responsiveness. By comparison, in the present embodiment shown in FIG. 7C, when the VTC operational speed sVTC is less than the second predetermined value sVTC2, due to the limit distance sL being set greater, a great actual distance rL is secured so that, as indicated by $\alpha 4$, even if the VCR operates at the maximum operational speed in a direction in which the piston TDC position will be higher, the conflict of the valve and piston may be avoided securely.

Figure 8A:
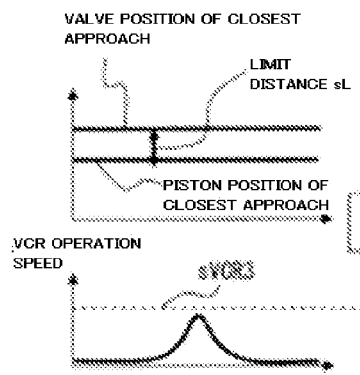
FIG. 8A is an explanatory diagram showing the setting the limit distance with respect of the operation speed of the variable valve train mechanism.
Figure 8B:
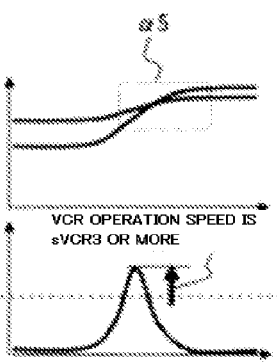
FIG. 8B is an explanatory diagram showing a Comparative Example without increasing the limit distance.
Figure 8C:
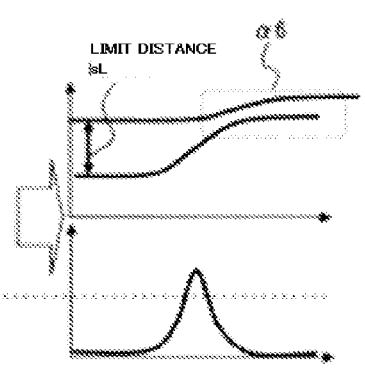
FIG. 8C shows a behavior of the embodiment with the limit distance increased, both when the operation speed of the variable compression ratio mechanism is equal to or greater than a third predetermined value.

[4] By referring to FIG. 8, in the present embodiment shown in FIG. 8C, when the VCR operational speed sVCR is equal to or greater than a third predetermined value sVCR3, compared to the case in which the VCR operational speed sVCR is less than the third predetermined value sVCR3, the limit distance sL is set greater. When the VCR operational speed sVCR is greater than the third predetermined value sVCR3 and, as shown in FIG. 8B as Comparative Example, the limit distance sL is not set greater, at the time of VCR runaway with high operational speed, the interference may not sufficiently avoided by advance movmement of the exhaust valve by VTC so that, as indicated by reference $\alpha 5$, the valve and the piston may come into interference. However, in the present embodiment shown in FIG. 8C, by setting the limit distance sL large, a large actual distance rL is secured in advance so that the valve and the piston may be avoided from being interfered even at the VCT runaway with high operational speed.

Figure 9A:
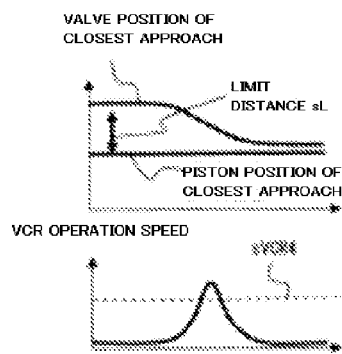
FIG. 9A is an explanatory diagram showing the setting the limit distance with respect of the operation speed of the variable valve train mechanism.
Figure 9B:
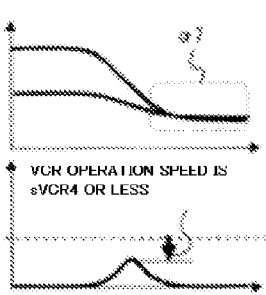
FIG. 9B is an explanatory diagram showing a Comparative Example without increasing the limit distance.
Figure 9C:
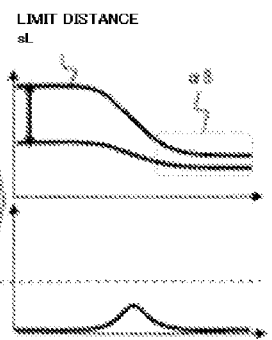
FIG. 9C shows a behavior of the embodiment with the limit distance increased, both when the operation speed of the variable compression ratio mechanism is equal to or less than a fourth predetermined value.

[5] By referring to FIG. 9, in the present embodiment shown in FIG. 9C, when the VCR operational speed sVCR is equal to or less than a fourth predetermined value sVCR4, smaller than the third predetermined value sVCR3, compared to the case in which the VCR operational speed sVCR is higher than the fourth predetermined value sVCR4 (and less than the third predetermined value sVCR3), the limit distance sL is set greater. When the VCR operational speed sVCR is smaller than the fourth predetermined value sVCR4 and, as shown in FIG. 9B as Comparative Example, the limit distance sL is not set greater, at the time of VTC runaway, the interference may not sufficiently avoided by lowering of the piston TDC position of VCR with low operational speed so that, as indicated by reference α7, the valve and the piston may come into interference. However, in the present embodiment shown in FIG. 9C, by setting the limit distance sL large, a large actual distance rL is secured in advance so that the valve and the piston may be avoided from being interfered even by the VCR with low operational speed.

Figure 10A:
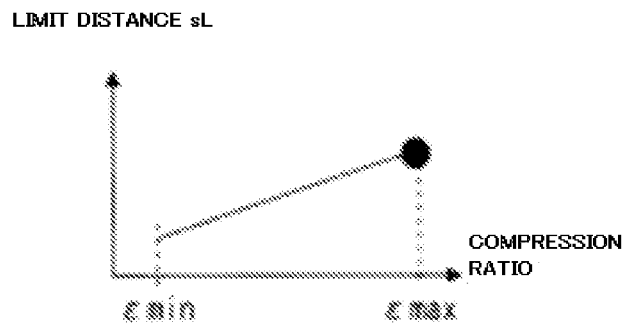
FIGS. 10A and 10B are explanatory diagrams illustrating to set the limit distance larger as the compression ratio (piston TDC position) becomes higher.
Figure 10B:
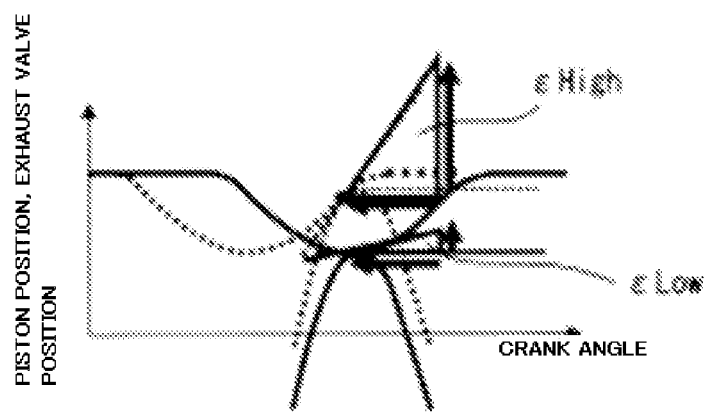

[6] FIG. 10 shows an example of the setting of the limit distance sL with respect to the piston TDC (top dead center) position (engine compression ratio). As shown in FIG. 10B, in the case in which a high compression ratio thigh is set with a high piston TDC position, compared to the case in which a low compression ratio SLow is set with the lower piston top dead center position, the amount of change in the distance of the closest approach between the valve and the piston per unit operational amount of the VTC is large. Therefore, as the piston TDC position becomes higher in the high compression ratio side, the risk of interference between the valve and piston at VTC runaway is high. Thus, in the example shown in FIG. 10A, as the engine compression ratio is higher and at the highest compression ratio emax with the highest piston TDC position, the limit distance sL is set to be maximum. Therefore, even at the VTC runaway with the setting in the high compression ratio side, the interference between the valve and the piston may be avoided reliably.

Figures 11A, 11B:
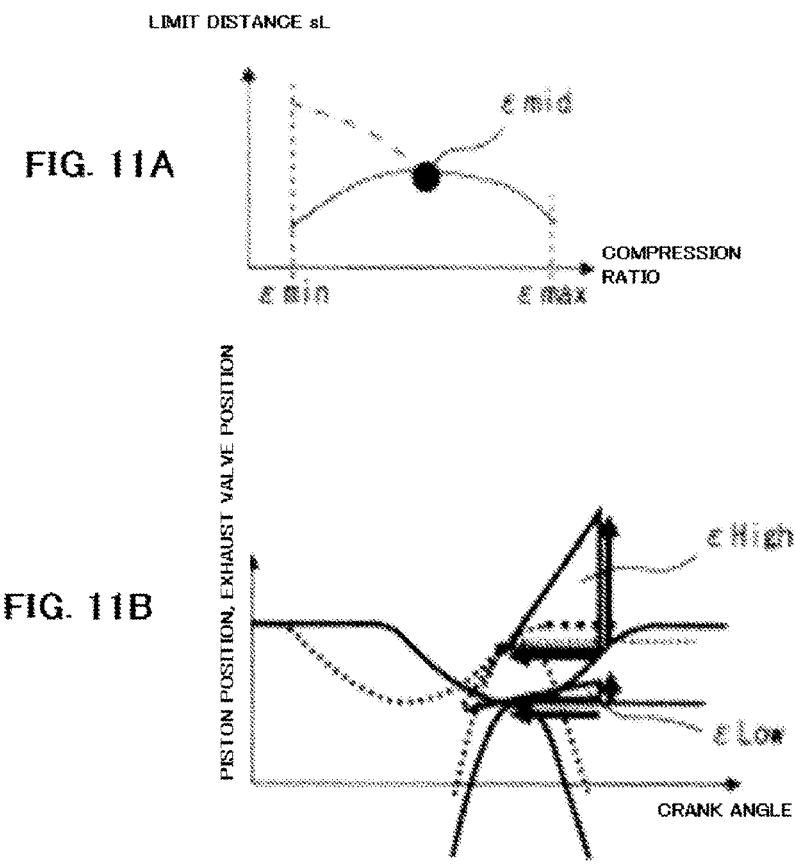
FIGS. 11A and 11B are explanatory diagrams illustrating to set the limit distance maximum at the intermediate compression ratio (at the intermediate piston TDC position).

[7] FIG. 11 shows another example of the setting of the limit distance sL with respect to the piston TDC (top dead center) position (engine compression ratio). As shown in FIG. 11B, in the case in which a low compression ratio SLow is set with a low piston TDC position, compared to the case in which a high compression ratio thigh is set with the higher piston top dead center position, when the piston position is changed by the VCR by a unit amount in the high compression ratio side, i.e., in the direction of higher piston position, the operation amount of the VTC necessary for the interference avoidance, i.e., the change in center phase angle will be greater. Therefore, at the piston TDC position being low on the low compression ratio side, as compared to the high compression ratio set with a high piston TDC position, at VCR runaway, it is necessary to secure the actual distance sL large enough to avoid the interference of the valve and the piston. Therefore, in the example shown in FIG. 11B, in a region in which the piston TDC position is higher than an intermediate compression ratio representing the piston TDC position being in an intermediate position, the limit distance sL is increased as the piston TDC position (compression ratio) lowers and the limit distance sL is set to be maximum at the intermediate compression ratio.

In the case of an internal combustion engine in which the distance between the valve and piston is set relatively large, since the piston top dead center position lowers in a region of compression ratio lower than the intermediate compression ratio amid, the distance of closest approach between piston and valve becomes sufficiently large, so that the correction for interference avoidance as described above is not required. Thus, in the example shown in FIG. 11A, the limit distance sL is set to be smaller as the compression ratio lowers than the intermediate compression ratio amid.

[8] Meanwhile, in the case of an internal combustion engine in which the valve to piston distance is set relatively small, as the engine compression ratio lowers, i.e., the piston top dead center position lowers, the risk of interference betwee the piston and the valve at the VTC runaway will be higher. Therefore, in this case, as shown by the characteristics in the one-dot chain line in FIG. 11A, the limit distance sL is set larger as the engine compression ratio lowers such that the limit distance sL may assume the maximum at the lowest or minimum compression ratio min. Thus, in the setting of the low compression ratio with a lower piston top dead center position, due the large setting of the limit distance sL in advance, even when the VTC runs away inadvertently, it is ensured that interference between the piston and the valve can be avoided.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A control system for an internal combustion engine comprising:
  a piston top dead center (TDC) position variable mechanism configured to change a TDC position of a piston;
  a valve operational characteristics variable mechanism configured to change operational characteristics of at least one of an intake valve and an exhaust valve;
  a first detecting mechanism configured to detect an actual operation state of the piston TDC position variable mechanism;
  a second detecting mechanism configured to detect an actual operation state of the valve operational characteristics variable mechanism;
  a first operation speed estimating mechanism configured to estimate the operation speed of the piston TDC position variable mechanism;
  a second operation speed estimating mechanism configured to estimate an operation speed of the valve operational characteristics variable mechanism;
  an actual distance calculation mechanism configured to calculate an actual distance of closest approach of a valve and the piston based on the actual operation state of the piston TDC position variable mechanism and the actual operation state of the valve operational characteristics variable mechanism;
  a limit distance setting mechanism which sets a limit distance between the valve and the piston representing a distance of closest approach necessary to avoid interference between the valve and the piston, based on at least one of the operation speed of the piston TDC position variable mechanism and the operation speed of the valve operational characteristics variable mechanism; and
  a distance increasing mechanism that drives at least one of the piston TDC position variable mechanism and the valve operational characteristics variable mechanism when it is determined that the actual distance is less than a limit distance, in order to increase the distance of closest approach of the valve and the piston.

2. The control system as claimed in claim 1, wherein the limit distance setting mechanism is configured to set the limit distance greater when the operational speed of the valve operational characteristics variable mechanism is equal to or greater than a first predetermined value.

3. The control system as claimed in claim 1, wherein the limit distance setting mechanism is configured to set the limit distance greater when the operational speed of the valve operational characteristics variable mechanism is equal to or less than a second predetermined value.

4. The control system as claimed in claim 1, wherein the limit distance setting mechanism is configured to set the limit distance greater when the operational speed of the valve operational characteristics variable mechanism is equal to or larger than a third predetermined value.

5. The control system as claimed in claim 1, wherein the limit distance setting mechanism is configured to set the limit distance greater when the operational speed of the valve operational characteristics variable mechanism is equal to or less than a fourth predetermined value.

6. The control system as claimed in claim 1, wherein the limit distance setting mechanism is configured to set the limit distance maximum at the piston TDC position being at a maximum.

7. The control system as claimed in claim 1, wherein the limit distance setting mechanism is configured to set the limit distance maximum at the piston TDC position being at an intermediate position.

8. The control system as claimed in claim 1, wherein the limit distance setting mechanism is configured to set the limit distance maximum at the piston TDC position being at a minimum.

* * * * *